United States Patent [19]
Reitmeier

[11] 4,376,955
[45] Mar. 15, 1983

[54] TWO DIMENSIONAL ADAPTIVE DROPOUT COMPENSATOR AND CHROMA INVERTER

[75] Inventor: Glenn A. Reitmeier, Trenton, N.J.

[73] Assignee: RCA Corporation, New York, N.Y.

[21] Appl. No.: 170,811

[22] Filed: Jul. 21, 1980

[30] Foreign Application Priority Data

Feb. 28, 1980 [GB] United Kingdom ............... 8006722

[51] Int. Cl.³ .................... H04N 9/491; H04N 5/78
[52] U.S. Cl. ................................... 358/314; 360/38.1
[58] Field of Search ................. 358/8, 21 R, 314; 360/38, 38.1

[56] References Cited

U.S. PATENT DOCUMENTS

| | | |
|---|---|---|
| 4,122,489 | 10/1978 | Bolger et al. ..................... 358/21 |
| 4,199,780 | 4/1980 | Taylor ................................. 358/8 |
| 4,250,521 | 2/1981 | Wright ................................ 358/8 |

FOREIGN PATENT DOCUMENTS 1436757 5/1976 United Kingdom .

*Primary Examiner*—Aristotelis M. Psitos
*Attorney, Agent, or Firm*—E. M. Whitacre; W. H. Meise; H. I. Steckler

[57] ABSTRACT

A dropout compensator for time spread digital television signals uses either horizontal or vertical averaging to replace a dropped out sample. The choice of direction is made in accordance with whichever direction has the least amount of change around the missing sample or pixel. The circuitry can also be used for chroma inversion when stop or slow motion is to be transmitted or recorded.

10 Claims, 5 Drawing Figures

TWO DIMENSIONAL ADAPTIVE DROPOUT COMPENSATOR AND CHROMA INVERTER

BACKGROUND OF THE INVENTION

The present invention relates to dropout compensators, and more particularly to such compensators for use with time spreading codes.

In magnetic tape recording, tape defects or scratches can cause a loss of signal during playback, which is commonly referred to as a dropout. In the case of analog video tape recorders, the occurrence of a dropout results in the loss of a portion of a video scan line, which causes a horizontal streak to appear in the TV picture. A conventional approach to dropout compensation is to replace the portion of the line in error with some average of adjacent scan lines; however, this replacement can result in noticeable distortion in pictures which have very sharp vertical or angular edges. By "vertical edge" is meant that there is an intensity change in the vertical direction. In digital video tape recording, tape dropouts result in the loss of data. If the digital data is recorded on tape in the same sequence as it was obtained from the original analog video signal, then a dropout has the same effect as in an analog recorder, some horizontally adjacent sequence of data in a scan line is lost, and it must be estimated by combining some vertically adjacent data.

It is therefore desirable to selectively use information from one of several directions to reconstruct a signal that has dropped out.

SUMMARY OF THE INVENTION

The invention comprises recording the video so that originally adjacent samples are not adjacently recorded. During reproduction, if a dropout occurs, the difference between samples in one direction with respect to the dropped out sample is computed, the difference between samples is at least one other direction with respect to the dropped out sample is computed, and whichever difference is less controls the direction of data from which an average is computed to substitute for the dropped-out sample.

DESCRIPTION OF THE DRAWINGS

FIG. 3A shows the recording format of the invention, while

FIG. 3B illustrates consecutive samples some of which are in error; and

DETAILED DESCRIPTION

Figure 1:
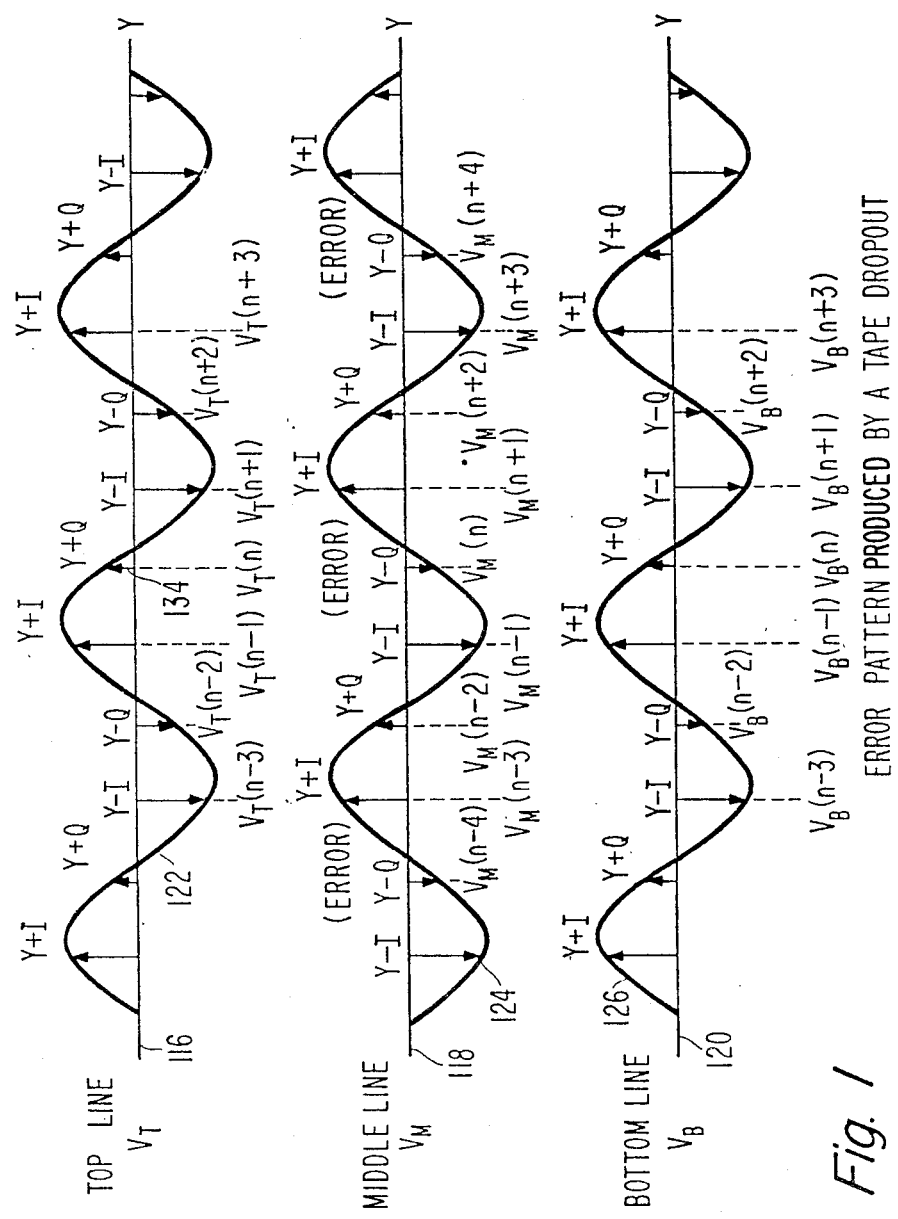
FIG. 1 shows a sampled video signal having errors.

This invention is an adaptive selector which uses averaging in one of a plurality of directions to replace dropout data, where the selection is based on averaging in the direction of minimum change. In a preferred embodiment, it is desired to use either horizontal or vertical averaging to replace dropout data from a digital television signal. Since adjacent horizontal and adjacent vertical information is made available by choice of proper tape format, estimates of the missing data can be made from the top, bottom, left and right, which are denoted as $\hat{f}_T$, $\hat{f}_B$, $\hat{f}_L$ and $\hat{f}_R$ respectively. The horizontal estimate of the data is then $$\hat{f}_H = \tfrac{1}{2}(\hat{f}_L + \hat{f}_R),$$

while the vertical estimate is $$\hat{f}_V = \tfrac{1}{2}(\hat{f}_B + \hat{f}_T).$$

The actual replacement of lost data, f, is then given by $f=\hat{f}_H$, if $|\hat{f}_L-\hat{f}_R| \leq |\hat{f}_B-\hat{f}_T|$, or $f=\hat{f}_V$ if otherwise.

In other words, the criterion for the selection of the data reconstruction is the minimum difference of the components of the horizontal and vertical estimates, although it is understood that any portion of those estimates (such as that portion representing only luminance information) can be used. The sampling frequency of the digital television signal preferably is at four times the color subcarrier frequency, or 14.32 MHz for an NTSC video signal. In such a signal, the chrominance component (C) comprises the sum of two signals, called I and Q, that are in ninety degree phase relationship with respect to each other and have the chrominance subcarrier frequency. The phase of the sampling frequency is preferably chosen so that a first of the sampling times occurs when the I signal is a maximum. This means that the Q signal is zero due to the ninety degree phase shift therebetween. Thus the sampled signal at said first sample time comprises the luma and the I signal (Y and I). The second sample time occurs at a period of 1/14.32 MHz=70 nanoseconds after the first sample time. This is one quarter of a period of the subcarrier which comprises a ninety degree phase shift of the subcarrier so that now I=O and Q has its maximum value. Thus, the sampled signal at the second sampling time is Y+Q. The third sampling time corresponds to a total phase shift of 180 degrees of the subcarrier signal from the first sampling time. Again, I has its maximum value, but with the 180 degree phase shift, while Q=O. Thus, the sampled signal is Y−I. The fourth sampling time has a total phase shift of 270 degrees from the first sampling time. The Q signal is at its negative maximum, while I=O. Thus, the sampled signal is Y−Q. The fifth sampling time has a 360 degree phase relationship with respect to the original sampling time, which means that the sampled signal is in phase with the signal at the first sample time, so that the sampled signal again comprises Y+I. Thus, the sequential samples are Y+I, Y+Q, Y−I, Y−Q, Y+I, Y+Q, Y−I, etc., for a total of 63.5 μs/70 ns, or 910 samples per line for an NTSC signal. However, it is understood that sampling may occur at any phase relative to color burst (not just along the I and Q axes) and produce equivalent results.

FIG. 1 shows samples represented by arrows for three vertically adjacent television lines of a scanning raster. The straight lines 116, 118, and 120 represent the luminance (Y) signal which is constant over the area shown in FIG. 1. The sine waves 122, 124, and 126 are shown for the top, middle and bottom lines respectively of the area in question. They represent the color subcarrier signal with their magnitude representing color saturation and their phase representing hue. The saturation and hue are a constant over the area shown in FIG. 1. It is noted that for the same color, the phase of the sine wave 124 is 180° out of phase with respect to the sine waves 122 and 126 due to the inversion of the subcarrier phase with respect to the horizontal sync pulse between adjacent lines within a field. The total voltage existing on any one line is the sum of the luminance plus the sinusoidal chrominance signal. In the following discussion, "v" represents the voltage at any sampling point, the subscripts "t", "m", and "b" representing the "top", "middle", and "bottom" lines respectively, while the letter "n" with a numeral represents the sample point in question with respect to a selected center sample point. Consider now center sample point $V_M(n)$ on line 118. It will be noted that the signal at this point comprises $Y-Q$. For the sample points to the left and right of point $V_M(n)$, the type (I or Q) and polarity of the chrominance component alternates as explained above. The top and bottom lines 116 and 120 are similar except for a phase inversion of the chrominance component.

Observing the error pattern in FIG. 1, it is samples $V_M(n)$, $V_M(n+4)$, $V_M(n-4)$, etc., that are in error, i.e. every fourth sample is in error due to the use of a time spreading code as explained below. These samples occur at times or positions in which the data represented by the samples is of the form $Y-Q$. Note that the horizontally adjacent samples $V_M(n-1)$, and $V_M(n+1)$, represents signals of the form $Y-I$ and $Y+I$, so that in forming their average the I component cancels, and the resultant is the estimated value of Y at sample $v_M(n)$ since the picture is assumed to have little change over the area shown in FIG. 1. Other samples of $Y-I$ and $Y+I$ may be included in a weighted average to obtain a better estimate of the luminance Y, which will be shown in a following example. Since samples $V_M(n-2)$ and $V_M(n+2)$ are of the form $Y+Q$, subtracting the average of these two samples from the computed value of Y as obtained above results in a signal having a $-Q$ component. This can then be added to Y to form a $Y-Q$ signal, which is the replacement value for the sample in error $V_M(n)$.

This procedure is now applied to the three adjacent lines, in order to use the adaptive feature that was previously described. For a given error, the luminance values to the top, bottom, left and right of point $V_M(n)$ are respectively computed as shown below as a weighted sum ($\alpha$ and $\beta$ are some fixed coefficients) of surrounding samples which contain the desired information:

$$y_T(n) = \beta v_T(n-3) + \alpha v_T(n-1) + \alpha v_T(n+1) + \beta v_T(n+3) \quad (1)$$

$$y_B(n) = \beta v_B(n-3) + \alpha v_B(n-1) + \alpha v_B(n+1) + \beta v_B(n+3) \quad (2)$$

$$y_L(n) = \beta v_M(n-3) + \alpha v_M(n-1) \quad (3)$$

$$y_R(n) = \alpha v_M(n+1) + \beta v_M(n+3) \quad (4)$$

Now the adaptive criterion is applied to the luminance resuls to select the direction of further processing. (The entire reconstruction, i.e. both Y and C components, or any portion thereof, e.g. just Y or C components, can be used to select the appropriate direction.) Therefore, if $2|Y_L-Y_R| \leq |Y_T-Y_B|$, (the factor 2 is needed since twice as many terms are in $Y_T$ and $Y_B$ as are in $Y_L$ and $Y_R$), the picture changes less in the horizontal direction than in the vertical direction and a more accurate reconstruction can be achieved by proceeding with a reconstruction horizontally:

$$Y_{LR} = Y_L + Y_R \quad (5)$$
$$C = \tfrac{1}{2}[v_M(n-2) + v_M(n+2)] - Y \quad (6)$$

-continued
$$v_M(n) = Y - C = 2Y - \tfrac{1}{2}[v_M(n-2) + v_M(n+2)] \quad (7)$$

If $|Y_T-Y_B| < 2|Y_L-Y_R|$, the picture changes less vertically than horizontally, so proceed vertically:

$$\hat{Y}_{TB} = \tfrac{1}{2}(Y_T + Y_B) \quad (8)$$
$$\hat{C} = \tfrac{1}{2}[v_T(n) - Y_T + v_B(n) - Y_B] \quad (9)$$
$$\hat{v}_M(n) = \hat{Y} - \hat{C} \quad (10)$$

Thus, we have performed an adaptive reconstruction of the sample $V_M(n)$ that is in error.

Figure 2:
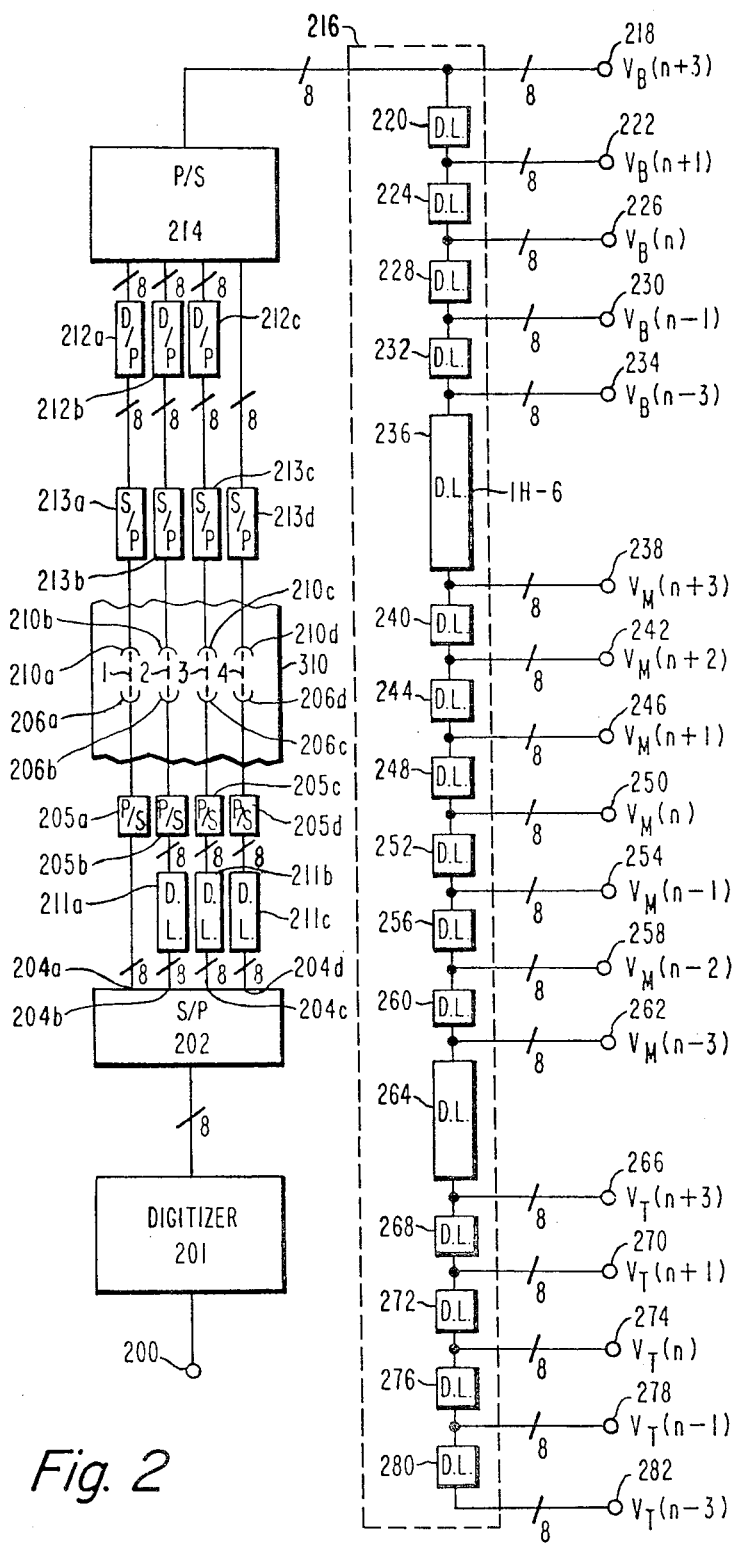
FIG. 2 shows a recording-reproducing apparatus in accordance with the invention.
Figure 3:
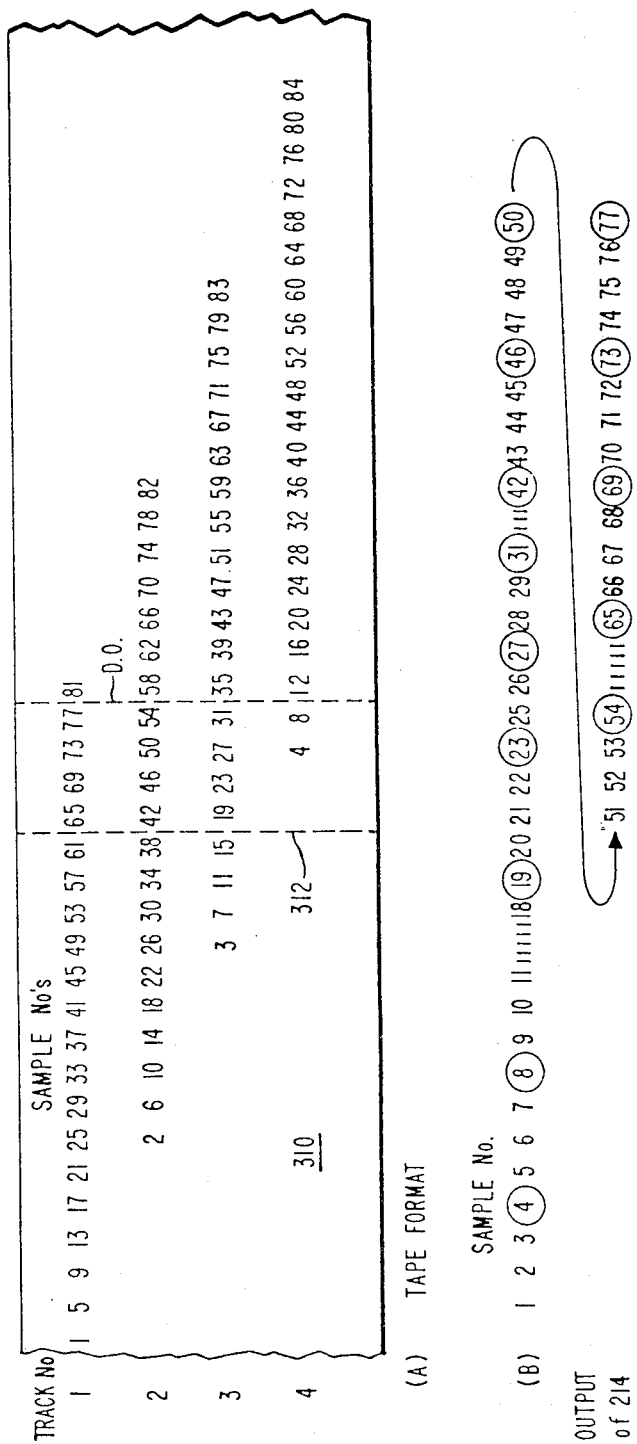

FIG. 2 shows a portion of the apparatus used to implement the above concept. An analog video signal is received at terminal 200 from a video source (not shown), e.g. a television camera. The signal is sampled and 8-bit quantized, i.e. there are 256 grey levels, by digitizer 201. For purposes of further discussion, the 8-bit samples from digitizer 201 are sequentially numbered in order of their time occurrence at the output of digitizer 201, e.g. 1, 2, 3, etc. These samples are applied to a series-to-parallel converter 202 in order to obtain four sequential samples in time coincidence, e.g. the eight bits each of samples 1, 2, 3, and 4 all at once, then samples 5, 6, 7, and 8, etc. Output 204a of converter 202 supplies samples 1, 5, 9, 13, etc. to a parallel-to-series converter 205a and from there the samples are applied to a recording head 206a in order to record track number 1 on a magnetic recording tape 310, as is more clearly shown in FIG. 3a. Output 204b of converter 202 supplies samples 2, 6, 10, 14 etc. to a delay line 211a, such as an 8-bit shift register, which in the particular embodiment shown has a delay of 6 sampling periods. The exact delay is not critical, but should be longer than the longest expected dropout length. Delay line 211a applies the samples 2, 6, 10, 14, etc. to parallel-to-series converter 205b, and from there the samples are applied to a recording head 206b that records track 2, which track due to delay line 211a is longitudinally offset with respect to track 1 as shown in FIG. 3a. Converter 202 output terminal 204c supplies samples 3, 7, 11, 15, 19, etc., to delay line 211b, that has a delay of 12 sampling periods. Head 206c records these samples on track 3, which track due to delay line 211b is offset with respect to track 2. Output 204d supplies samples 4, 8, 12, 16, 20, etc., to delay line 211c, which has a delay of 18 sampling periods and from there the samples are applied to a parallel-to-series converter 205d. Recording head 206d records these samples in track 4 which is offset with respect to track 3. Parallel-to-series converters 205a, b, c, and d are required since only one bit at a time can be recorded in any one of tracks 1, 2, 3, or 4. The time delay differences between delay lines 211a, b, and c are sufficiently long to ensure that the differential delay time between adjacent tracks is longer than the expected dropout length. Integer multiples are preferred for cost considerations.

Tracks 1, 2, 3, and 4 are reproduced by reproducing heads 210a, 210b, 210c and 210d respectively and the signals therefrom are respectively applied to series-to-parallel converters 213a, 213b, 213c and 213d, each of which converters supply all eight bits from a single sample from respective tracks at one time. The signal from converter 213a is applied to a delay line 212a that, in this embodiment, has a delay of 18 sampling periods, i.e. the delay is the same as the delay of delay line 211c. The signal from converter 213b is applied to a delay line 212b and is delayed by an amount equal to that of delay line 211b, i.e. 12 sampling periods. The signal from converter 213c is applied to delay line 212c that has a delay equal to that of delay line 211a, i.e. 6 sampling periods. The output signals from delay lines 212a, 212b and 212c, which delay lines can be 8-bit shift registers, are applied to parallel-to-series converter 214, while the signal from series-to-parallel converter 213d is applied directly to the converter 214. Thus, it will be appreciated that the signals from tracks 1, 2, 3, and 4 are in the same time coincidence when they are applied to the converter 214 as when they emerged from series-to-parallel converter 202. The output signal from parallel-to-series converter 214 comprises the samples in their original sequential order as shown in FIG. 3b. A dropped-out area 312 is shown in dotted lines in FIG. 3a. Therefore, none of the samples within the dotted area 312 will be present. The absent samples are circled in FIG. 3b.

The output signal from converter 214 is applied to a delay line chain designated generally as 216 in order to provide samples from the various lines in time coincidence for the previously discussed dropout compensation scheme. The output terminal 218 coupled directly to converter 214 provides sample $V_B(n+3)$. Delay line 220 has a delay of two sampling periods or 140 nanoseconds for a 14.32 MHz sampling frequency, and thus the signal at output terminal 222 is sample $V_B(n+1)$. Delay line 224 has a delay time of one sampling period (70 nanoseconds), and thus the signal at output terminal 226 is sample $V_B(n)$. Delay line 228 has a delay time of one sample period (70 nanoseconds) and thus the signal at output terminal 230 is sample $V_B(n-1)$. Delay line 232 has a delay of two sampling periods (140 ns), and thus the signal at output terminal 234 is sample $V_B(n-3)$. Delay line 236 has a delay of one horizontal line minus six sample periods (63.5 $\mu$s−420 ns), and thus output terminal 238 provides sample $V_M(n+3)$. Delay line 240 has a delay of one sampling period, and thus provides sample $V_M(n+2)$ at terminal 242. Delay line 244 has a delay of one sample period and thus provides at output terminal 246 sample $V_M(n+1)$. Delay line 248 has a delay of one sample period and thus provides at output terminal 250, the sample $V_M(n)$, the sample to be corrected. The estimated value that is substituted for a dropped out sample has an average time delay equal to that of the signal at terminal 250, since terminal 250 is at the center of delay line chain 216. Therefore, when a dropout is detected, the estimated value will be in coincidence with the sample at terminal 250, hence terminal 250 is used as the source of the output video data when no dropout occurs to avoid a time shift when switching between correct and estimated sample values.

The remaining half of delay line chain 216 is symmetrical to the above-described first half. Briefly, delay lines 252, 256, 260, 264, 268, 272, 276, and 280 have sample period delays of one, one, one horizontal line minus six samples, two, one, one, and two sample periods respectively and provide at output terminals 254, 258, 262, 266, 270, 274, 278, and 282 respectively the indicated signals for the middle and top lines 118 and 116.

Figure 4:
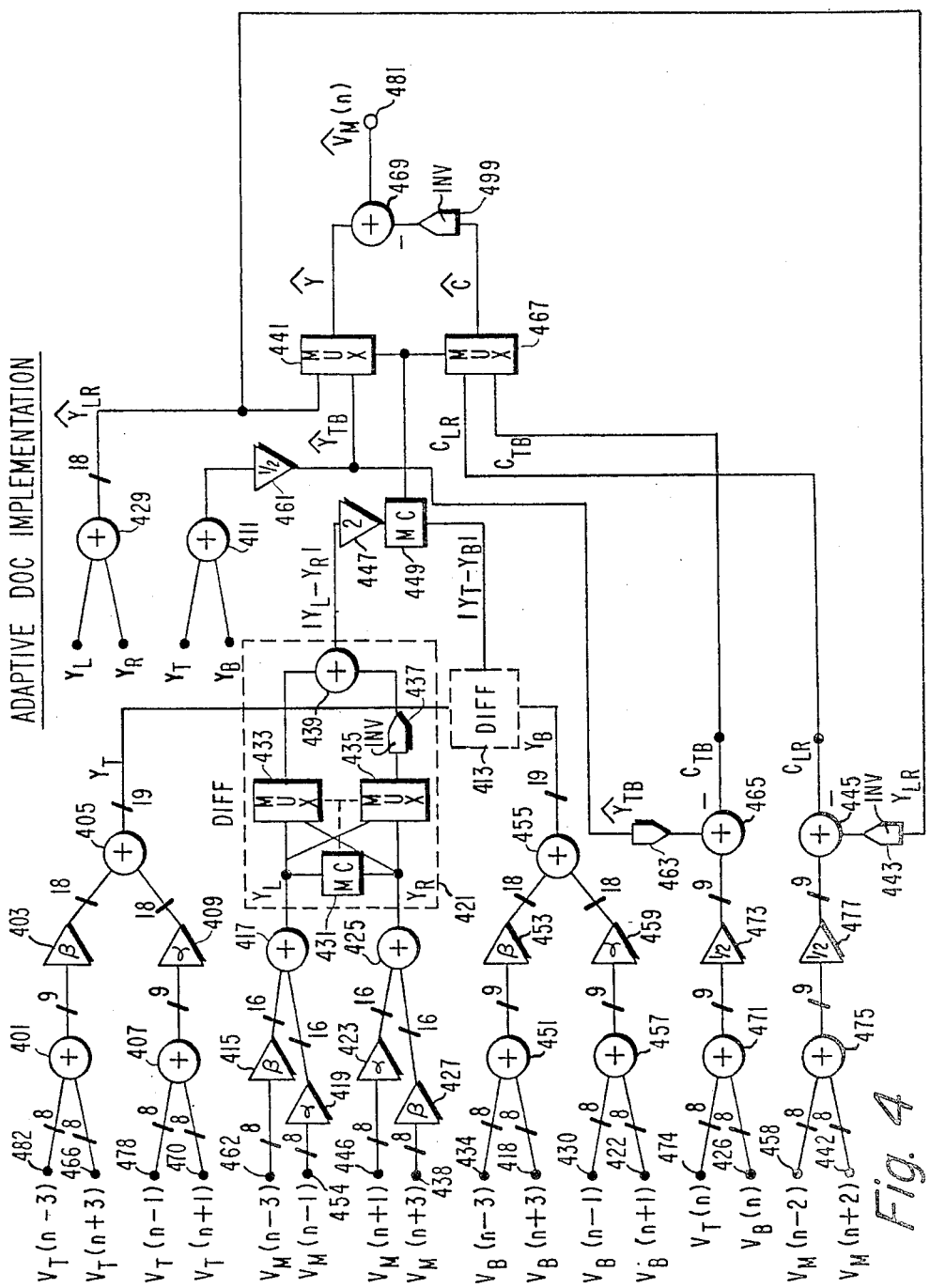
FIG. 4 shows a block diagram of correction circuitry in accordance with the invention.

FIG. 4 shows a block diagram to carry out the arithmetic computations required to adaptively compensate for dropouts. Eight-bit input terminals (starting at the top) 482, 466, 478, 470, 462, 454, 446, 438, 434, 418, 430, 422, 474, 426, 458, 442 are respectively coupled to the output terminals of FIG. 2 that have the same last two digits, e.g. output terminal 282 is coupled to input terminal 482, 266 is coupled to 466, etc. The designation of the signals received at each terminal are shown at the left of the terminal.

In order to compute the top luminance estimate signal $Y_T$ as defined in equation (1), eight-bit adder 401 receives signals from terminals 482 and 466 and supplies the resultant sum to multiplier 403 that multiplies said sum by the multiplier $\beta$. Multiplier 403 supplies the resulting product to adder 405. Adder 407 receives the signals at inputs 478 and 470 and supplies the resulting sum to multiplier 409, which multiplies said sum by the multiplier $\alpha$. Multiplier 409 applies the resulting product to adder 405. The resulting output sum from adder 405 is the signal $Y_T$, which signal is applied to adder 411 and absolute-value-of-the-difference producer (AVD) 413.

In order to compute the left luminance estimate signal $Y_L$ as defined in equation (3), the signal at terminal 462 is applied to multiplier 415, which multiplies said signal by $\beta$ and then applies the resulting product to adder 417. The signal at terminal 454 is applied to multiplier 419 for multiplication by $\alpha$, the resulting product being applied to adder 417. The sum output signal from 417 is the left estimate signal $Y_L$, and this sum is applied to adder 429 and also to AVD 421, which AVD 421 has a construction that is the same as that of AVD 413.

To produce the right estimate signal $Y_R$ as defined by equation (4), multiplier 423 multiplies the signal at terminal 446 by the factor $\alpha$, and applies the resulting product to adder 425, while multiplier 427 multiplies the signal at input 438 by $\beta$, and also applies the resulting product to adder 425. The resulting sum signal from adder 425 comprises the right estimate signal $Y_R$ that is applied to AVD 421, as well as to adder 429. Adder 429 supplies as its output signal a combined left and right estimate signal $\hat{Y}_{LR}$ as defined by equation (5) to MUX 441 and inverter 443 (at the bottom of FIG. 4), which inverter supplies the inverted $\hat{Y}_{LR}$ signal to adder 445.

AVD 421 comprises a magnitude comparator 431 that receives at its inputs the $Y_L$ and $Y_R$ signals and supplies control signals to MUX 433 and 435. The control signal is determined by which of the signals $Y_L$ and $Y_R$ is greater and insures that MUX 433 supplies the greater of said signals, and that MUX 435 supplies the lesser of said signals $Y_L$ and $Y_R$ to inverter 437. Thus, adder 439 always supplies at its output a signal representing a positive number that is the difference between its input signals, i.e. $|Y_L - Y_R|$, to multiplier 447. Multiplier 447 multiplies the signal from adder 439 by two, and supplies the resulting product to a magnitude comparator 449.

In order to compute the bottom line luminance estimate, $Y_B$ as defined in equation (2), adder 451 receives signals from terminals 434 and 418 and supplies the resulting sum to multiplier 453 that multiplies said sum by $\beta$ and applies the resulting product to adder 455. Adder 457 receives at its inputs signals from terminals 430 and 422 and applies the resulting sum to multiplier 459 that multiplies the sum by $\alpha$ and applies the resulting product to adder 455. The output signal from adder 455 is the bottom line estimate $Y_B$, which is applied to adder 411, as well as to absolute value difference producer 413, which as stated above, has the same construction circuit 421. The sum output signal from adder 411 is divided by two by multiplier 461. The resulting quotient is the top-bottom luminance estimate as defined by equation (8), and it is applied to MUX 441 and to inverter 463 and from inverter 463 to adder 465.

Difference producer or AVD 413 supplies at its output the absolute value of the difference between the top and bottom line estimates $|Y_T - Y_B|$ and applies it to magnitude comparator 449. Comparator 449 supplies a control signal to MUX 441 and 467 in accordance with whichever difference $|Y_L - Y_R|$ or $|Y_T - Y_B|$ is smaller. Thus, MUX 441 supplies to adder 469 whichever of the luminance estimates $\hat{Y}_{TB}$ or $\hat{Y}_{LR}$ is a better match to the luminance component of $V_M(n)$ of the missing sample point.

In order to compute the top-bottom chrominance estimate as defined by equation (9) adder 471 receives the signals at terminals 474 and 426 and supplies the resulting sum to multiplier 473 that divides said sum by two. The resulting product is applied to adder 465, which has the negative of the top-bottom luminance applied to it from inverter 463. The sum output signal from adder 465 is the top-bottom chrominance estimate $C_{TB}$, and this estimate is applied to MUX 467.

To compute the left-right chrominance estimate, as defined by equation (6), adder 475 receives the signals at terminals 458 and 442. The resulting sum is multiplied by one half by multiplier 447. The resulting product is applied to adder 445, which has the negative left-right luminance estimate applied to it from inverter 443. The resulting sum from adder 445 is the left-right chrominance estimate $C_{LR}$, which is applied to MUX 467.

MUX 467 supplies to inverter 479, under the control of the control signal from comparator 449, whichever of the chrominance estimates (left-right or top-bottom) is a better match to the chrominance component of the missing point $V_M(n)$. Adder 469 adds the best luminance and the negative of the best chrominance signal together to form a $Y - C$ signal as in equations (7) or (10) at output terminal 481 that is a best estimate for the lost sample $V_M(n)$.

The dropout estimates are produced continually in the manner described. When a dropout is detected in any known fashion, the corresponding estimate may be substituted for the missing samples. In a digital context, a dropout can readily be detected as a lack of signal transition when using a phase-change code.

It will be appreciated that other embodiments are within the spirit and scope of the invention. For example, an analog embodiment is possible. Then digitizer 201, would comprise just a sampler and the various delay lines would be analog delay lines, e.g. charge coupled devices.

In NTSC, there is a four field sequence of color subcarrier phase relative to horizontal sync, i.e. $+ + - -$, where + means an initially positive going color subcarrier and − an initially negative going one. When using a helical scan video recorder in the stop motion or variable play modes, the normal sequence will not be transmitted, e.g. in the stop mode, there will be no phase change at all. It is not permitted to transmit such a signal. By performing selective phase inversion of the color subcarrier, a signal in accordance with NTSC standards is obtained. In analog tape recorders, this function can be performed by averaging points of inverted chroma phase to replace the point with current phase. Since the adaptive dropout compensator circuit of the present invention computes luminance and chrominance, the same adaptive method can be used for chroma inversion by either one of two methods:

1. using the current sample or pixel from output 250 minus the computed luminance from the output of MUX 441 to compute the chrominance, i.e. $C = v_M(n) - \hat{Y}$; $v_M(n) = \hat{Y} - C$; or
2. using the average of adjacent pixels (of opposite phase) from the output of MUX 467 to compute the chroma, and changing the final subtraction to addition, i.e. $v_M(n) - Y + C$, by replacing inverter 479 by a direct connection between MUX 467 and adder 469.

Thus, the present invention provides adaptive dropout compensation or adaptive chroma inversion using virtually the same set of hardware to perform both functions.

What is claimed is:

1. A method for correcting dropped-out samples of recorded data, said method comprising computing the difference between samples in one direction with respect to the dropped out sample, computing the difference between samples in at least one other direction with respect to the dropped out sample, and computing an average of data from one of said directions in accordance with whichever of said differences is less.

2. A method as claimed in claim 1 wherein said data comprises a sampled video signal.

3. A method as claimed in claim 2 wherein said video signal comprises a color video signal and the sampling of said sampled video signal occurs at a rate of four times the color subcarrier.

4. A method as claimed in claim 1 wherein said directions are orthogonal with respect to each other.

5. A method as claimed in claim 4 wherein said directions are horizontal and vertical.

6. An apparatus for correcting dropped-out samples of recorded data, said apparatus comprising means for computing the difference between samples in one direction with respect to the dropped-out sample, means for computing the difference between samples in at least one other direction with respect to the dropped-out sample, and means for computing an average of data from one of said directions in accordance with whichever of said differences is less.

7. An apparatus as claimed in claim 6 wherein said data comprises a sample video signal.

8. An apparatus as claimed in claim 7 wherein said video signal comprises a color video signal and the sampling of said sampled video signal occurs at a rate of four times the color subcarrier.

9. An apparatus as claimed in claim 6 wherein said directions are orthogonal with respect to each other.

10. An apparatus as claimed in claim 9 wherein said directions are horizontal and vertical.

* * * * *

UNITED STATES PATENT AND TRADEMARK OFFICE
CERTIFICATE OF CORRECTION

PATENT NO. : 4,376,955
DATED : March 15, 1983
INVENTOR(S) : Glenn Arthur Reitmeier It is certified that error appears in the above—identified patent and that said Letters Patent is hereby corrected as shown below:

Col. 3, line 68   "C" should be -- $\hat{C}$ --
                 "Y" should be -- $\hat{Y}$ --

Col. 4, line 2   "$v_M(n) = Y - C = 2Y \ldots$" should be
                -- $\hat{v}_M(n) = \hat{Y} - \hat{C} = 2\hat{Y} \ldots$ --

Col. 8, Claim 1,
     line 23   after "comprising" insert -- producing samples in a plurality of directions with respect to a dropped out sample, --
     line 27   after "sample," insert -- determining which of said differences is less, --

Col. 8, Claim 6,
     line 41   after "comprising" insert -- means for producing samples in a plurality of directions with respect to a dropped-out sample, --
     line 46   after "sample," insert -- means for determining which of said differences is less, --

Signed and Sealed this

Seventh Day of August 1984

[SEAL]

Attest:

GERALD J. MOSSINGHOFF

Attesting Officer     Commissioner of Patents and Trademarks